(12) United States Patent
Morikawa et al.

(10) Patent No.: US 7,909,130 B2
(45) Date of Patent: Mar. 22, 2011

(54) ELECTRIC POWER STEERING APPARATUS

(75) Inventors: Akihiko Morikawa, Chiyoda-ku (JP);
Yoshihito Asao, Chiyoda-ku (JP);
Tadayuki Fujimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 394 days.

(21) Appl. No.: 12/041,886

(22) Filed: Mar. 4, 2008

(65) Prior Publication Data
US 2009/0133955 A1    May 28, 2009

(30) Foreign Application Priority Data
Nov. 28, 2007    (JP) ................................. 2007-307676

(51) Int. Cl.
*B62D 5/04* (2006.01)
(52) U.S. Cl. ........................... 180/444; 180/443; 310/71
(58) Field of Classification Search .................. 180/443, 180/444, 446; 310/89, 68 R, 71
See application file for complete search history.

(56) References Cited

U.S. PATENT DOCUMENTS

| | | | | |
|---|---|---|---|---|
| 6,107,716 A | * | 8/2000 | Penketh ........................ | 310/89 |
| 6,707,185 B2 | * | 3/2004 | Akutsu et al. .................. | 310/71 |
| 6,989,616 B2 | * | 1/2006 | Okubo et al. .................. | 310/64 |
| 7,021,418 B2 | * | 4/2006 | Tominaga et al. ............. | 180/444 |
| 7,032,290 B2 | * | 4/2006 | Hirano et al. .................. | 29/596 |
| 7,109,617 B2 | * | 9/2006 | Mizutani et al. ............... | 310/71 |
| 2003/0127921 A1 | | 7/2003 | Akutsu et al. | |
| 2009/0267430 A1 | * | 10/2009 | Imamura et al. ............... | 310/71 |

FOREIGN PATENT DOCUMENTS

| | | |
|---|---|---|
| JP | 2003-204654 | 7/2003 |
| JP | 3638269 B2 | 9/2003 |
| WO | 2007/026894 A1 | 3/2007 |

OTHER PUBLICATIONS

Chinese Communication dated Oct. 13, 2010.

* cited by examiner

*Primary Examiner* — Anne Marie M Boehler
(74) *Attorney, Agent, or Firm* — Sughrue Mion, PLLC

(57) ABSTRACT

A drive control unit alone can be replaced without detaching an electric power steering apparatus from a gear housing. A motor housing of an electric motor, which outputs assist torque to a steering wheel of a vehicle, and a drive housing of the drive control unit, which controls the driving of the electric motor, are coupled to each other at a mating surface in a surface to surface contact manner, and the drive housing and the gear housing are coupled with each other on the same axis. A location of connection, at which a power supply input terminal block of the electric motor and power supply bus bars of the drive control unit are connected to each other by us of screws, is arranged at a joint location at which the motor housing and the drive housing are joined to each other by screws.

14 Claims, 9 Drawing Sheets

ELECTRIC POWER STEERING APPARATUS

BACKGROUND OF THE INVENTION

1. Field of the Invention

The present invention relates to an electric power steering apparatus equipped with an electric motor for outputting assist torque to a steering wheel of a vehicle, and a drive control unit for controlling the driving of an output shaft of the electric motor.

2. Description of the Related Art

In the past, there has been known an electric power steering apparatus in which a motor housing of an electric motor, which is adapted to output an assist torque to a steering wheel of a vehicle, and a drive housing of a drive control unit, which serves to control the driving of an output shaft of the electric motor, are fixedly secured to each other at a mating surface in a surface to surface contact manner, and in which the motor housing and a gear housing that receives therein a gear connected with the output shaft of the electric motor are coupled with each other on the one and same axis (see, for example, a first patent document: Japanese Patent No. 3,638,269 (FIG. 3, paragraph No. 0072)).

In such an electric power steering apparatus, the electric motor and the drive control unit are integrated with each other, so that the entire apparatus can be reduced in size, and the length of electrical wiring that electrically connects between the electric motor and the drive control unit can be shortened as much as possible, as a consequence of which the production cost thereof can be reduced due to the reduction in the cost of materials, etc., or the reduction of electric power loss, noise and so on can also be achieved.

The electric power steering apparatus as constructed above is fitted to a vehicle body in a vehicle production line in a factory as a power steering mechanism that is formed integral with the steering wheel, a column shaft, etc.

In general, in case where the entire electric power steering apparatus is to be replaced by a new one, the power steering mechanism including the electric power steering apparatus is first detached or dismounted from the vehicle body, and the electric power steering apparatus is then replaced by the new one.

In the replacement of an electric power steering apparatus, only the drive control unit built therein, which includes a lot of semiconductor parts and has a high failure rate, is sometimes desired to be replaced. In this case, in the electric power steering apparatus, a location of connection at which a connecting portion of the electric motor and a connecting portion of the drive control unit are connected with each other by screws, is inside a joint location of the motor housing and the gear housing, so there has been the following problem. That is, it is necessary to take the trouble of once detaching or dismounting the electric power steering apparatus from the gear housing of the power steering mechanism, then removing the screws in the electrically connecting portions through an opening portion of the motor housing at a gear housing side, thereafter detaching the drive control unit from the electric motor, and replacing it with a new one.

SUMMARY OF THE INVENTION

Accordingly, the present invention is intended to obviate the problems as referred to above, and has for its object to provide an electric power steering apparatus in which upon replacement of a drive control unit, it becomes possible to replace only the drive control unit with a new one without detaching the electric power steering apparatus from a gear housing, thereby improving the replacement operation of the drive control unit to a substantial extent.

Bearing the above object in mind, according to the present invention, there is provided an electric power steering apparatus in which a motor housing of an electric motor, which is adapted to output an assist torque to a steering wheel of a vehicle, and a drive housing of a drive control unit, which serves to control the driving of an output shaft of the electric motor, are fixedly secured to each other at a mating surface in a surface to surface contact manner, and in which the motor housing and a gear housing that receives therein a gear connected with the output shaft of the electric motor are coupled with each other on the one and same axis, wherein a location of connection, at which a connecting portion of the electric motor and a connecting portion of the drive control unit are electrically connected to each other, is arranged at a joint location at which end portions of the motor housing and the drive housing are joined to each other.

According to the electric power steering apparatus of the present invention, the location of connection at which the connecting portion of the electric motor and the connecting portion of the drive control unit are electrically connected to each other is arranged at a joint location at which the end portions of the motor housing and the drive housing are joined to each other, so it becomes possible to detach the drive control unit alone without removing the electric motor from the gear housing after the electric power steering apparatus has been mounted on the gear housing, as a result of which the efficiency of the repair and replacement operation for the drive control unit can be improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
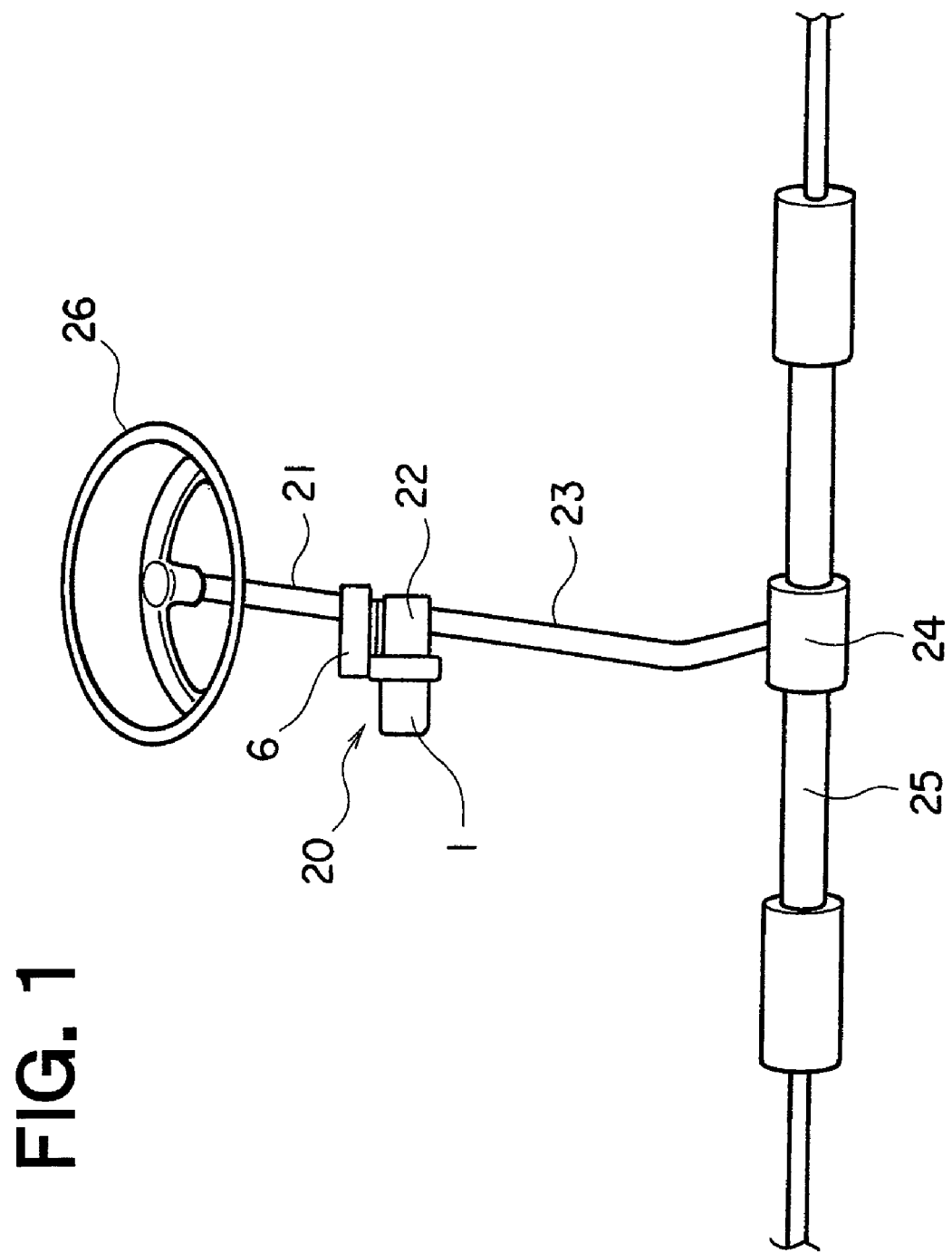
FIG. 1 is a perspective view showing a power steering mechanism in which an electric power steering apparatus according to a first embodiment of the present invention is incorporated.

Now, preferred embodiments of the present invention will be described in detail while referring to the accompanying drawings. Throughout individual figures, the same or corresponding members or parts are identified by the same reference numerals and characters.

Embodiment 1

Figure 2:
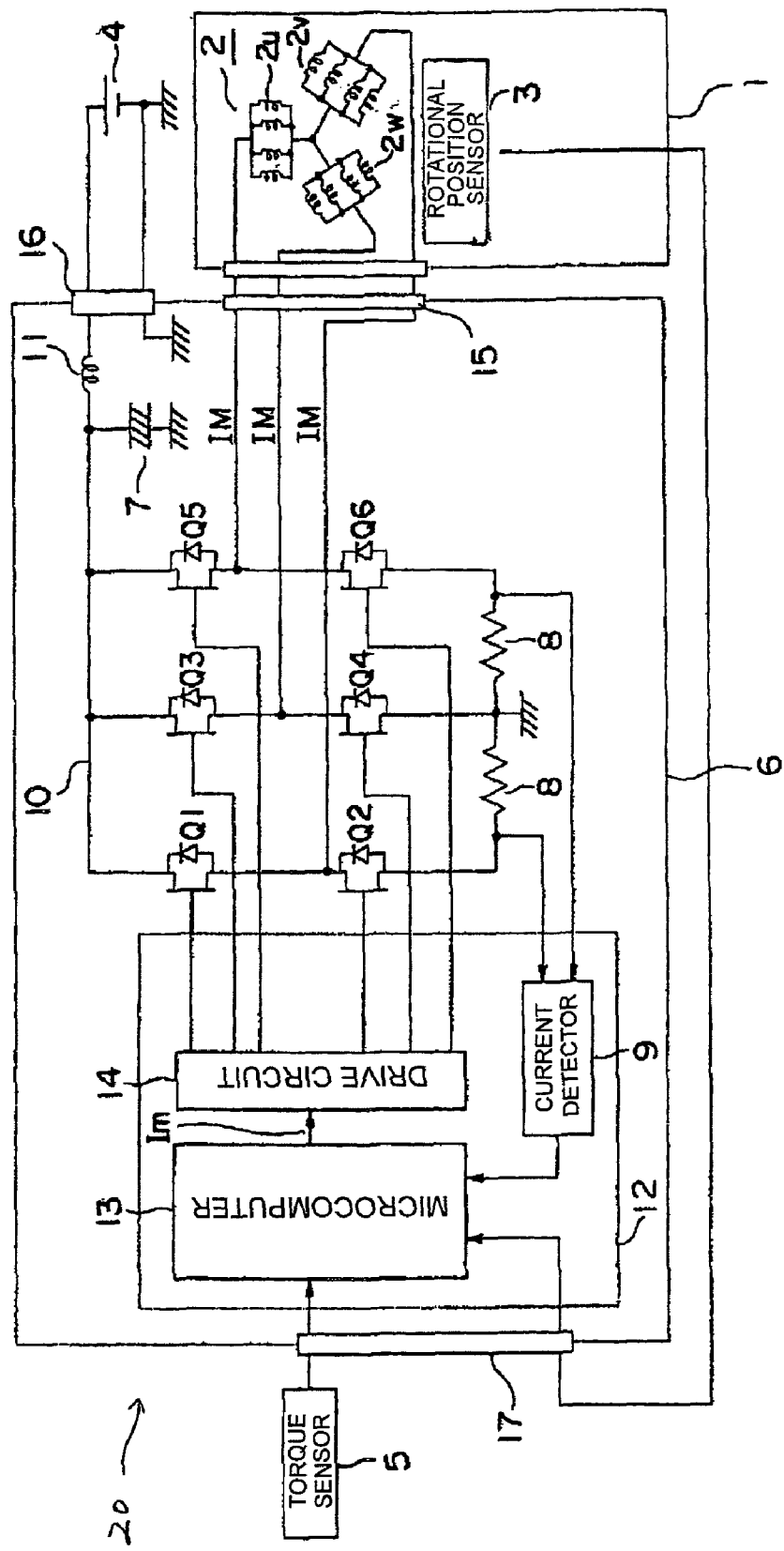
FIG. 2 is a block diagram showing the electric power steering apparatus in FIG. 1.
Figure 3:
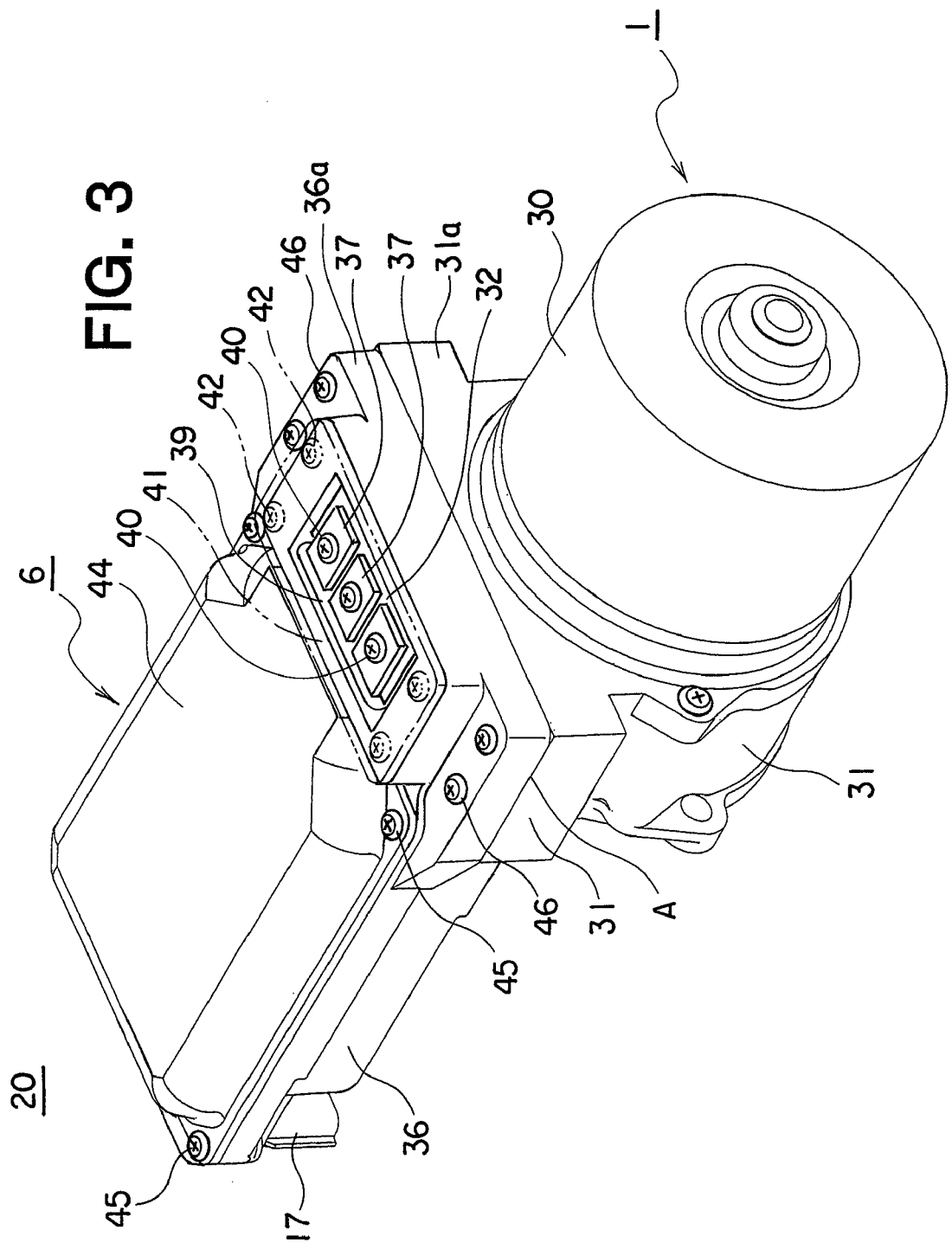
FIG. 3 is a perspective view showing the electric power steering apparatus in FIG. 1.
Figure 4:
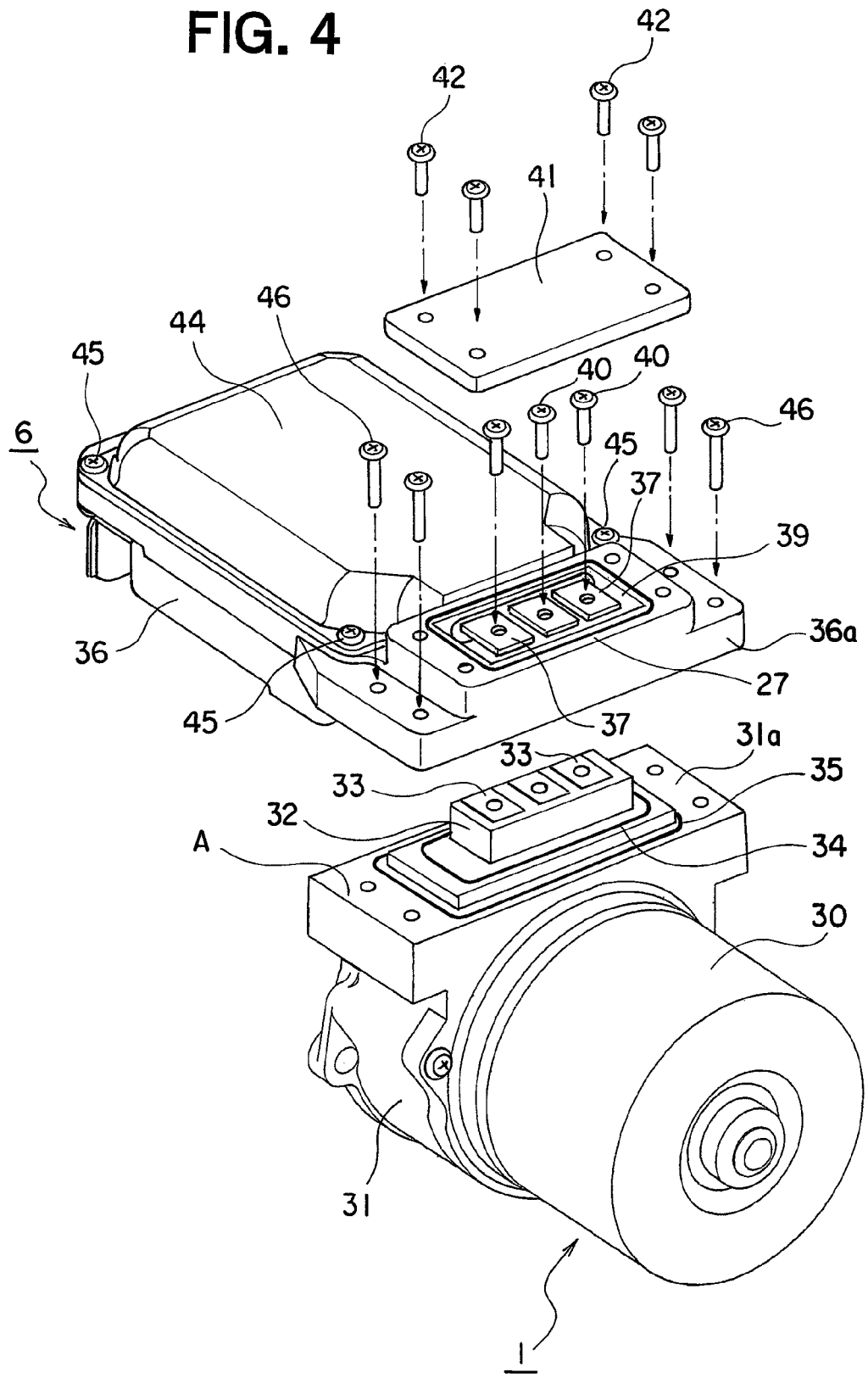
FIG. 4 is an exploded perspective view showing the electric power steering apparatus in FIG. 1.

Referring to the drawings and first to FIG. 1, there is shown, in a perspective view, a power steering mechanism in which an electric power steering apparatus 20 according to a first embodiment of the present invention is incorporated. FIG. 2 is a block diagram of the electric power steering apparatus 20 in FIG. 1. FIG. 3 is a perspective view that shows the electric power steering apparatus 20 in FIG. 1. FIG. 4 is an exploded perspective view that shows the electric power steering apparatus 20 in FIG. 1.

In the power steering mechanism, a steering force from a steering wheel 26 of a vehicle is transmitted to a steering wheel joint 23 through a column shaft 21. The electric power steering apparatus 20 is mounted on the column shaft 21 through a gear housing 22 that receives therein a worm gear. The output (i.e., torque and the number of revolutions per minute) of an output shaft of an electric motor 1 of the electric power steering apparatus 20 is transmitted to a steering wheel joint 23 while being changed in the rotational direction thereof in a perpendicular manner and is reduced in the rotational speed thereof by means of the worm gear.

A steering gear, being received in a gear box 24, is arranged at an end of the steering wheel joint 23. This steering gear serves to transmit the rotational motion of the steering wheel joint 23 to a rack 25 as a linear motion, so that a required amount of displacement of the rack 25 can be obtained. Road wheels (not shown) of the vehicle, being connected with the rack 25 at its opposite ends, respectively, can be driven to move in association with the linear motion of this rack 25, whereby the change in direction or the like of the vehicle can be done.

The electric power steering apparatus 20 includes the electric motor 1 adapted to output an assist torque to the steering wheel 26, a drive control unit 6 for controlling the driving of the output shaft of the electric motor 1, a battery 4 for supplying electric current to the electric motor 1 for the driving thereof, a torque sensor 5 for detecting the steering torque of the steering wheel 26 and generating a corresponding steering torque signal, a motor connector 15 in the form a connection location for electrically connecting the drive control unit 6 and the electric motor 1 to each other, a power connector 16 for electrically connecting the battery 4 and the drive control unit 6 to each other, and a signal connector 17 for electrically connecting the electric motor 1, the torque sensor 5, and the drive control unit 6 to one another.

The electric motor 1 in the form of a three-phase brushless motor includes the output shaft, a rotor having a permanent magnet of eight magnetic poles fixedly attached to the output shaft, a stator arranged around the rotor, and a rotational position sensor 3 that is arranged at an output side of the output shaft for detecting the rotational position of the rotor.

The stator is fixedly secured to an inner wall surface of a motor frame 30 of a bottomed cylindrical shape at a side of a motor housing 31 opposite to the drive control unit 6.

The stator has twelve salient poles in opposition to an outer periphery of the permanent magnet, and armature windings 2 (2u, 2v, 2w) fitted to the salient poles and connected to one another so as to form three phases U, V and W.

The drive control unit 6 includes a large-capacity capacitor 7 for absorbing a ripple component of a motor current IM flowing through the electric motor 1, a pair of shunt resistors 8 for detecting the motor current IM, a three-phase bridge circuit 10 comprising a plurality of semiconductor switching elements (e.g., FETs) Q1-Q6 for switching the motor current IM according to the magnitude and direction of the assist torque, a coil 11 for removing electromagnetic noise, and a control circuit 12.

The control circuit 12 includes a current detector 9 connected across opposite ends of the serially connected shunt resistors 8 for detecting the electric current supplied to the electric motor 1, and a microcomputer 13 for calculating an assist torque required based on the steering torque signal from the torque sensor 5 as well as calculating an amount of electric current corresponding to the assist torque thus obtained based on the motor current IM and the rotational position of the rotor in a feedback manner. The microcomputer 13 generates and outputs a drive signal for controlling the bridge circuit 10 to the bridge circuit 10 through a drive circuit 14.

In the electric power steering apparatus 20 as constructed above, the motor housing 31 of the electric motor 1, which is adapted to output the assist torque to the steering wheel 26 of the vehicle, and a drive housing 36 of the drive control unit 6, which serves to control the driving of the output shaft of the electric motor 1, are fixedly coupled to each other by means of four screws 46 at a mating surface A at which a pair of mounting portions 31a, 36a are placed in surface to surface contact with each other. Also, in the electric power steering apparatus 20, the motor housing 31 is coupled with the gear housing 22, which receives therein the worm gear connected with the output shaft of the electric motor 1, on the same axis. When seen along a direction perpendicular to that axis, the drive control unit 6 is arranged at a side at which it overlaps with the gear housing 22. The mating surface A is perpendicular to a diametrical or radial direction of the axis.

In the drive housing 36, there is received the capacitor 7, the shunt resistors 8, the three-phase bridge circuit 10 comprising the plurality of semiconductor switching elements Q1 through Q6, the coil 11, the control circuit 12 and so on.

The drive housing 36 has an opening portion which is adapted to be closed with a cover 44 by using four screws 45.

The mounting portion 31a of the motor housing 31 is formed with a power supply input terminal block 32 in the form of a connecting portion. Terminals 33 of the individual phases electrically connected to the armature windings 2 (2u, 2v, 2w), respectively, are constructed in the power supply input terminal block 32, and nuts (not shown) are embedded in the power supply input terminal block 32 at the rear side of the terminals 33 of the individual phases.

The individual terminals 33 are connected to corresponding power supply bus bars 37, respectively, in the form of a connecting portion exposed from the interior of the drive control unit 6 by using screws 40 in the form of fastening members.

The mounting portion 36a of the drive housing 36 is formed at its upper portion with an opening portion, and this opening portion is closed with a cover 41 through an O ring 27 in the form of a sealing member made of silicon by using screws 42.

The power supply input terminal block 32 and the power supply bus bars 37 are confined in a chamber 39, which is enclosed by a wall and blocked from the outside, by closing the cover 41. Here, note that O rings 34, 35 made of silicon are arranged around the power supply input terminal block 32 so as to ensure the air tightness, water proofness and dust proofness of the chamber 39 in a more reliable manner.

Now, reference will be made to the procedure for mounting the drive control unit 6 on the electric motor 1 of the electric power steering apparatus 20.

First of all, the mounting portion 31a of the motor housing 31 of the electric motor 1 and the mounting portion 36a of the drive housing 36 of the drive control unit 6, which are respectively assembled separately from each other, are placed in surface to surface contact with each other, and coupled with each other by use of the screws 46. At this time, the individual terminals 33 of the power supply input terminal block 32 and the individual power supply bus bars 37 are placed in surface to surface contact with each other.

After this, the screws 40 in the form of the fastening members are fastened to join the individual terminals 33 and the individual power supply bus bars 37, respectively. Subsequently, the opening portion of the chamber 39 is closed with the cover 41, and then the cover 41 is joined to an upper surface of the mounting portion 36a of the drive housing 36 by coupling the screws 42 at four corners of the cover 41.

When the drive control unit 6 is to be removed or detached from the electric power steering apparatus 20, the cover 41 is first detached from the mounting portion 36a of the drive housing 36 by removing the four screws 42. Thus, the power supply bus bars 37, which are the connecting portion at the side of the drive control unit 6, and the power supply input terminal block 32, which is the connecting portion at the side of the electric motor 1, are exposed, and subsequently, by detaching the screws 40, and then detaching the four screws 46, the drive control unit 6 can be detached from the electric motor 1. That is, the drive control unit 6 can be removed from the electric motor 1 without detaching the electric motor 1 from the gear housing 22. Here, note that the directions of movement of the screws 46, 40, 42, the cover 41 and the drive control unit 6 in this series of mounting and detaching operations are vertical with respect to the mating surface A.

Next, reference will be made to the operation of the electric power steering apparatus as constructed above.

The microcomputer 13 takes in the steering torque from the torque sensor 5, and the rotational position of the rotor of the electric motor 1 from the rotational position sensor 3, and at the same time, the motor current IM is input to the microcomputer 13 from the shunt resistors 8 through the current detector 9 in a feedback manner, whereby the microcomputer 13 creates a power steering rotational direction command and a quantity of current control corresponding to the assist torque, respectively, which are input to the drive circuit 14. The drive circuit 14, when supplied with the rotational direction command and the current control quantity, generates a PWM drive signal, which is then applied to the semiconductor switching elements Q1 through Q6 of the bridge circuit 10.

As a result, electric current flows from the battery 4 to the electric motor 1 through external wiring, the power connector 16, the coil 11, the bridge circuit 10, the motor connector 15 and external wiring, so that the electric motor 1 can produce a required quantity of assist torque in a required direction.

According to the electric power steering apparatus 20 as constructed above, a location of connection, which is a component element of the motor connector 15 at which the power supply input terminal block 32 in the form of the connecting portion of the electric motor 1 is connected to the power supply bus bars 37 in the form of the connecting portion of the drive control unit 6, is arranged at a joint location at which the mounting portion 31a of the motor housing 31 and the mounting portion 36a of the drive housing 36 are joined to each other, so the drive control unit 6 can be removed from the electric motor 1 without detaching the electric motor 1 from the gear housing 22, and hence the efficiency of the repair and replacement operation of the drive control unit 6 can be improved.

In addition, in the drive control unit 6, the power supply bus bars 37 have a simple construction extending into the chamber 39 connected to the power supply input terminal block 32, and are preferable particularly in case where there are a lot of constraints in the design of the drive control unit 6.

Moreover, the motor housing 31 of the electric motor 1 is coupled with the gear housing 22, and is higher in rigidity as compared with the drive housing 36 of the drive control unit 6, so the reliability of connection of the power supply bus bars 37 to the power supply input terminal block 32 formed on the highly rigid motor housing 31 can be improved.

Further, the mating surface A between the mounting portion 31a and the mounting portion 36a is a vertical surface perpendicular to a diametrical direction of the common axis of the motor housing 31 and the gear housing 22, so it is suitable for the case where there is a sufficient space in the diametrical direction, and the mounting portion 31a and the mounting portion 36a can be matched with each other at the mating surface A from the diametrical direction with a spatial margin in a reliable manner, thus making it possible to prevent mis-assembly and defects in assembly.

Furthermore, the electric motor 1 and the drive control unit 6 are coupled with each other by fastening the screws 40, which are movable toward and away from the mating surface A along a vertical direction with respect thereto, thereby electrically connecting the power supply input terminal block 32 and the power supply bus bars 37 to each other. As a result, this is suitable for the case where there is an enough space in a diametrical direction, and it is possible to join the power supply bus bars 37 to the power supply input terminal block 32 from a diametrical direction with a spatial margin in a reliable manner.

In addition, since the power supply input terminal block 32 and the power supply bus bars 37 are arranged in the chamber 39 formed in the interior of the mounting portion 36a, it is possible to avoid damage to component parts in the individual interiors of the drive housing 36 and the motor housing 31, which would otherwise be caused at the time of removing and attaching operations of the screws 40 in the course of replacement of the drive control unit 6.

Moreover, the opening portion of the chamber 39 is closed by the detachable cover 41, so it is possible to prevent foreign matter, water or the like from entering the chamber 39.

Further, since the directions of movement of the individual screws 40, 42, 46 in which the screws 40, 42, 46 are fastened and unfastened are vertical with respect to the mating surface A, there is the following designing advantage. That is, when the position of mounting or fixedly attaching the electric power steering apparatus 20 to the gear housing 22 is decided, it is easy to lay out the steering gear in such a manner that the steering gear can be set in a direction to ensure a space for making it possible to take out an arm of an operator, a tool, and the drive control unit 6 in the vehicle.

Furthermore, the drive control unit 6 is arranged at a side at which it overlaps with the gear housing 22 when seen along a direction perpendicular to the axis thereof, so the overall axial dimension of the drive control unit 6 and the gear housing 22 can be reduced.

In addition, there is often a relatively appropriate space available around the gear housing 22, and this embodiment is suitable for such a case.

Embodiment 2

Figure 5:
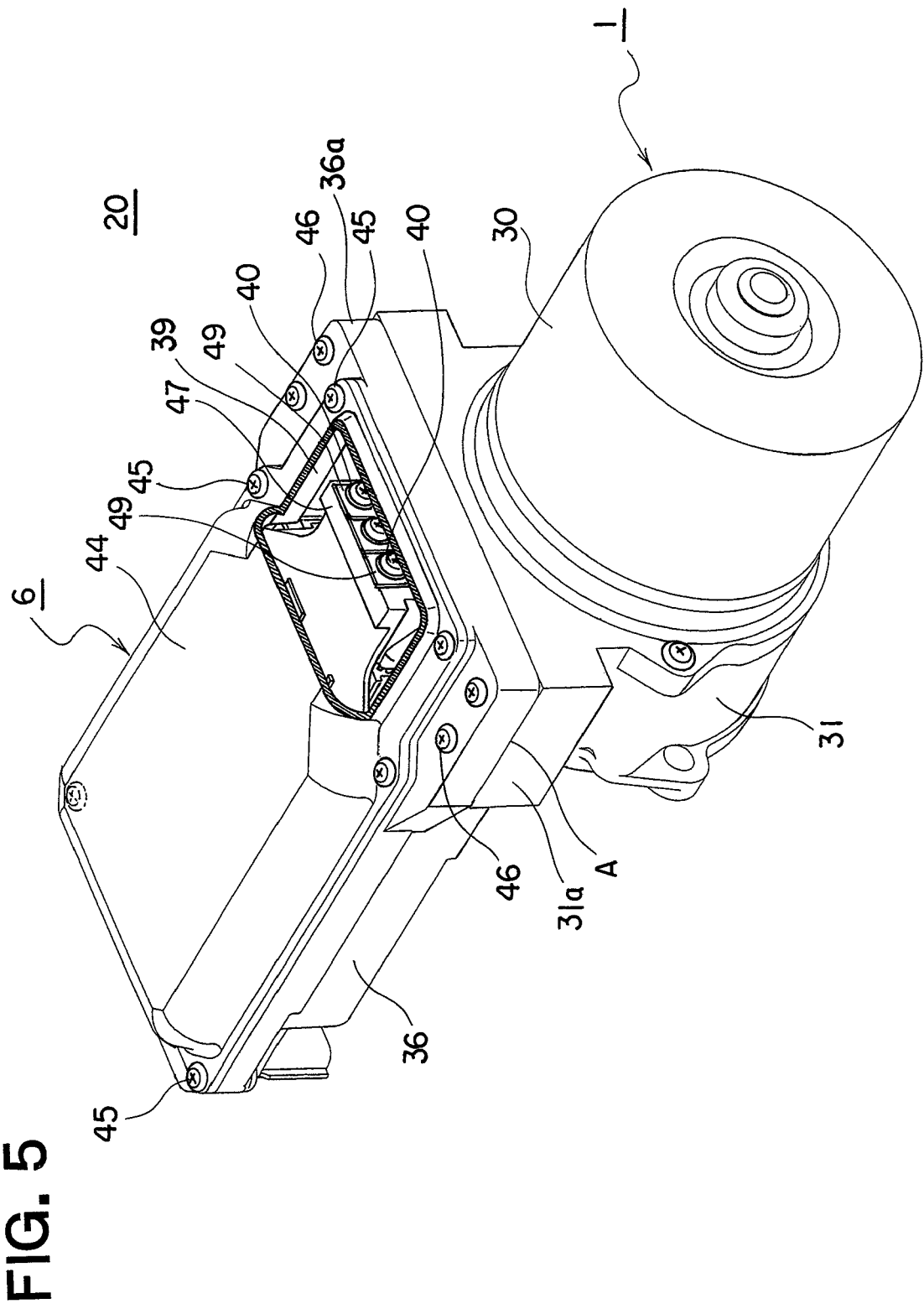
FIG. 5 is a perspective view showing an electric power steering apparatus according to a second embodiment of the present invention.

FIG. 5 is a perspective view that shows an electric power steering apparatus 20 according to a second embodiment of the present invention.

In this second embodiment of the present invention, a power supply terminal block 47 and power supply input bus bars 49, which serve as a connecting portion, are all arranged in a drive housing 36. The power supply input bus bars 49 extend from a motor housing 31 in diametrical directions The power supply input bus bars 49 are in surface to surface contact with terminals of the power supply terminal block 47, and by fastening three screws 40 in an axial direction, the power supply input bus bars 49 are joined to the terminals of the power supply terminal block 47.

A drive housing 36 has an opening portion which is adapted to be closed with a cover 44 by using six screws 45. In addition, an O ring (not shown) is arranged between the drive housing 36 and the cover 44 for ensuring air tightness therebetween.

The construction of this second embodiment other than the above is similar to that of the first embodiment.

In this second embodiment of the present invention, when only the drive control unit 6 is to be detached, the six screws 45 are first removed to open the cover 44. Then, since the power supply terminal block 47 is exposed, by first removing the three screws 40 and then the four screws 46, only the drive control unit 6 can be removed from the electric motor 1 even if the electric motor 1 is not detached from the gear housing 22. While in the above-mentioned first embodiment, the directions of movement of the individual screws 40, 42, 46 are all the same diametrical direction, in this second embodiment, the direction of movement of the screws 40 in the form of the fastening members is the axial direction. So the operation efficiency is slightly inferior to that in the first embodiment, but on the side of the electric motor 1, the power supply input bus bars 49 have a simple construction extending into the chamber 39, and hence this second embodiment is preferable particularly in case where there are a lot of design constraints such as the size of the electric motor 1.

In addition, the cover 44 also serves to close the opening portion of the chamber 39, so the cover 41 in the first embodiment becomes unnecessary, and the number of component parts required can be reduced, and the cost of production is lower as compared with the first embodiment.

The effects of this second embodiment other than the above are similar to those of the first embodiment.

Embodiment 3

Figure 6:
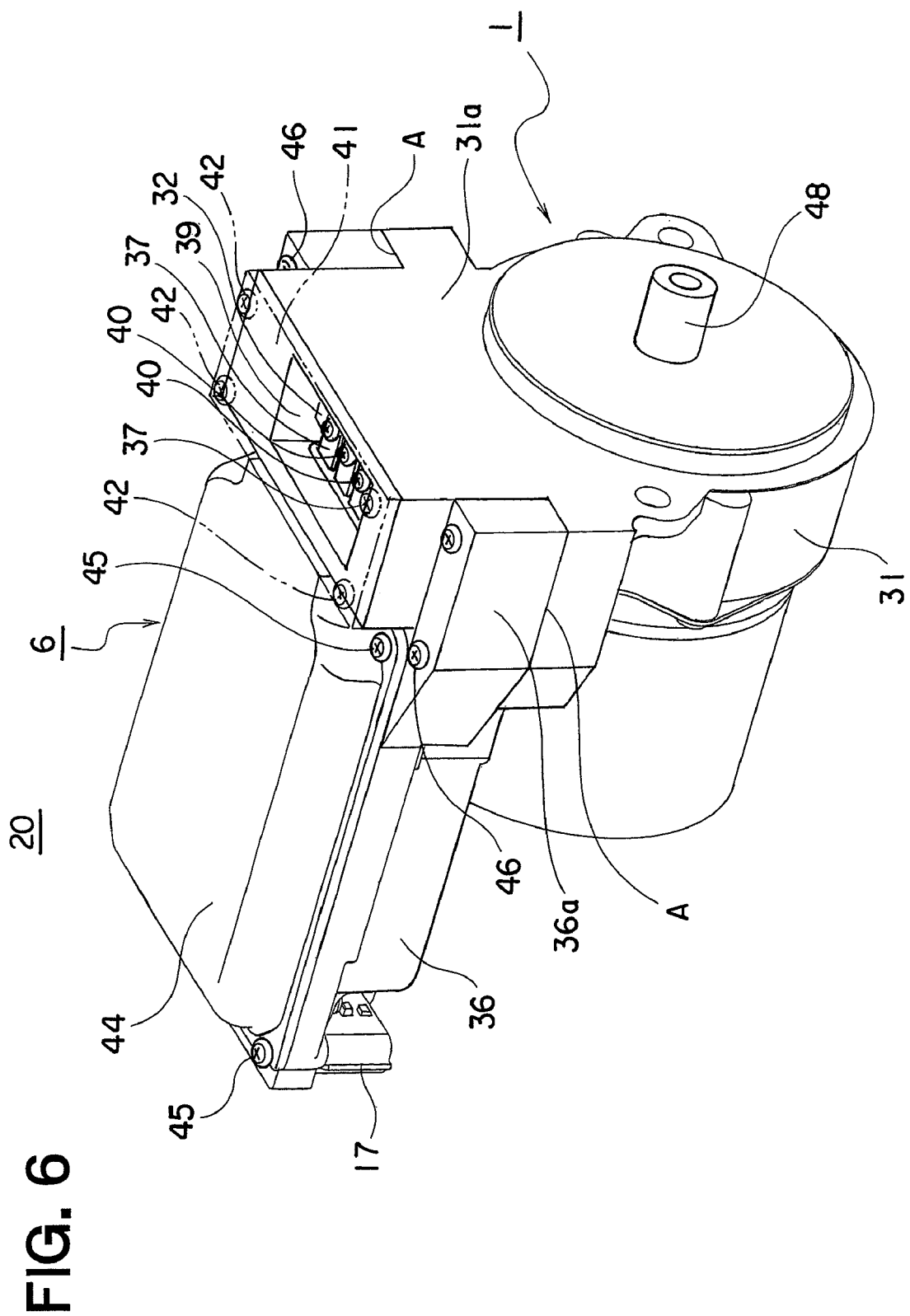
FIG. 6 is a perspective view showing an electric power steering apparatus according to a third embodiment of the present invention.

FIG. 6 is a perspective view that shows an electric power steering apparatus according to a third embodiment of the present invention.

This third embodiment of the present invention is different from the above-mentioned first embodiment in that a drive control unit 6 is arranged at a side at which it overlaps with an electric motor 1 when seen along a direction perpendicular to the axis thereof.

The other construction of this third embodiment is similar to that of the first embodiment.

In this third embodiment of the present invention, it is preferable that in case where there is no space available in the diametrical surroundings of a gear housing 22, the drive control unit 6 can be arranged at a location not conflicting with the gear housing 22.

The effects of this third embodiment other than the above are similar to those of the first embodiment.

Embodiment 4

Figure 7:
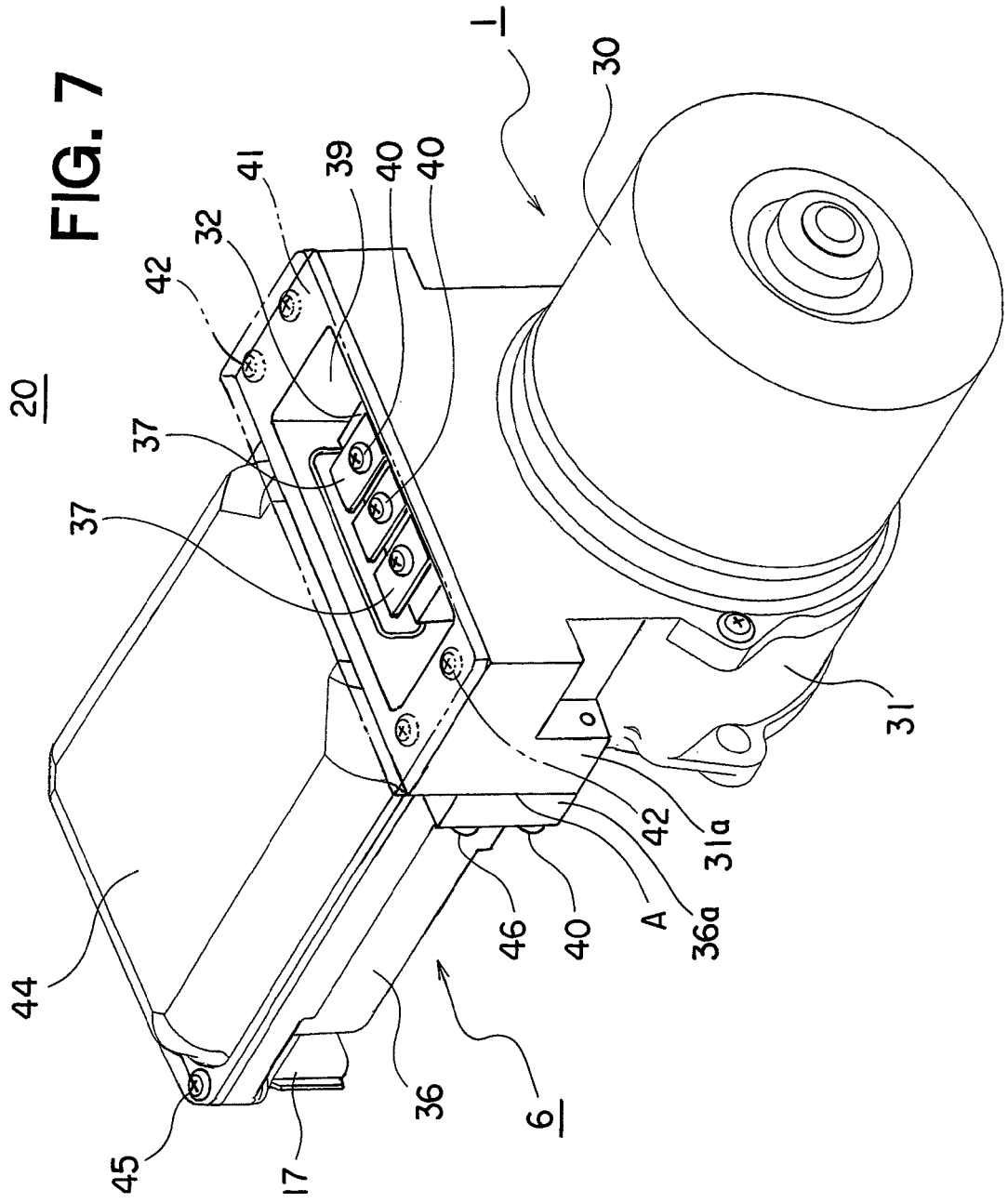
FIG. 7 is a perspective view showing an electric power steering apparatus according to a fourth embodiment of the present invention.

FIG. 7 is a perspective view that shows an electric power steering apparatus 20 according to a fourth embodiment of the present invention.

In this fourth embodiment of the present invention, a mating surface A between a mounting portion 31*a* of a motor housing 31 and a mounting portion 36*a* of a drive housing 36 is a vertical plane with respect to an axis of an electric motor 1.

The other construction of this fourth embodiment is similar to that of the first embodiment.

While in the above-mentioned first embodiment, the directions of movement of the individual screws 40, 42, 46 are all vertical with respect to the mating surface A, in this fourth embodiment, the direction of movement of screws 46 is the axial direction. So the operation efficiency is slightly inferior to that in the first embodiment, but this fourth embodiment is preferable in the case of a vehicle layout in which a drive control unit 6 of a large size can be mounted on or detached from the drive motor 1 only in an axial direction thereof.

The effects of this fourth embodiment other than the above are similar to those of the first embodiment.

Embodiment 5

Figure 8:
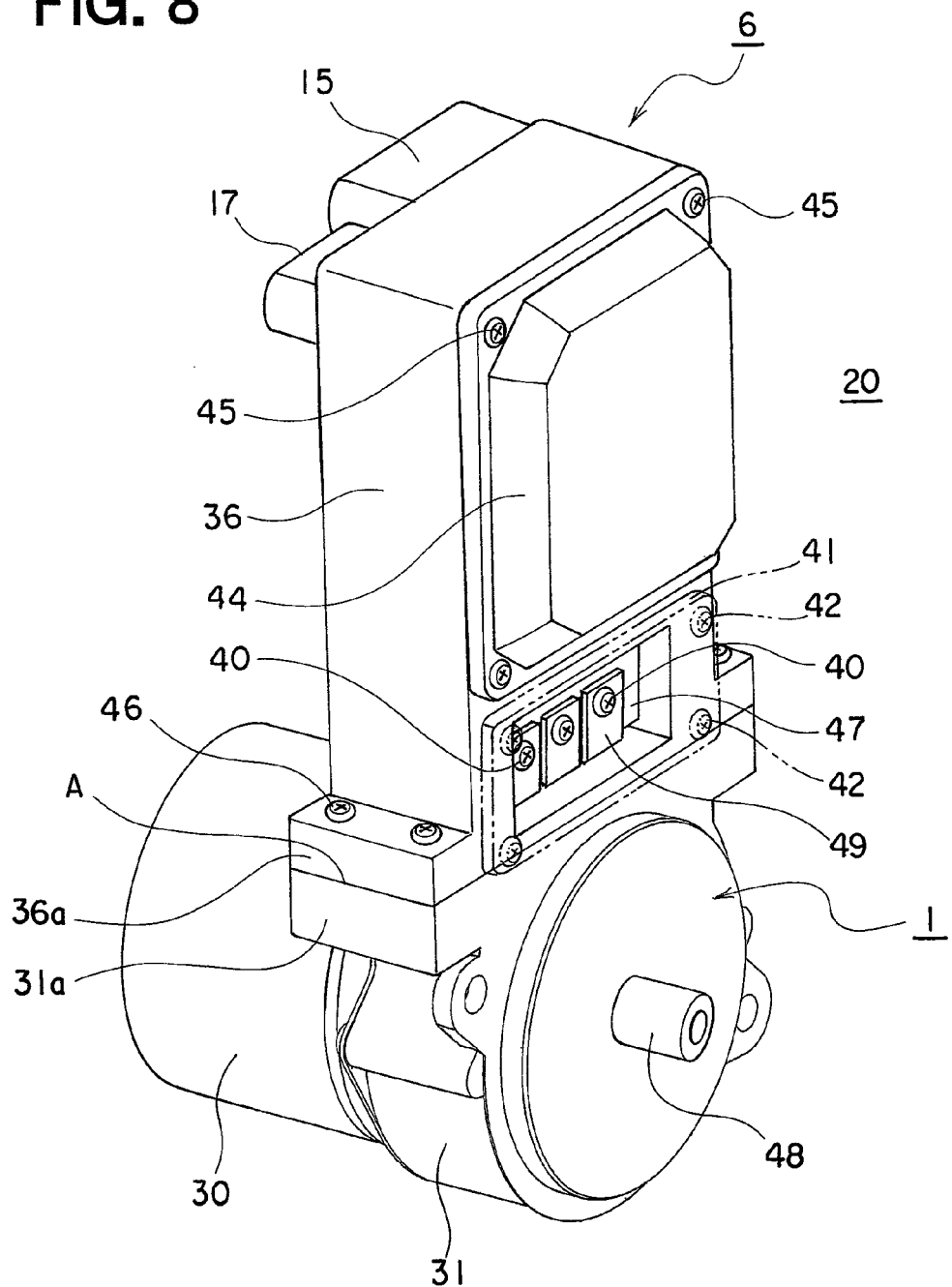
FIG. 8 is a perspective view showing an electric power steering apparatus according to a fifth embodiment of the present invention.

FIG. 8 is a perspective view that shows an electric power steering apparatus 20 according to a fifth embodiment of the present invention.

In this fifth embodiment of the present invention, a mating surface A between a mounting portion 31*a* of a motor housing 31 and a mounting portion 36*a* of a drive housing 36 is a vertical plane with respect to a diametrical direction of an axis of an electric motor 1, and a drive control unit 6 is mounted on the electric motor 1 in such a manner that it extends in a direction perpendicular to the axis of the electric motor 1.

The construction of this fifth embodiment other than the above is similar to that of the second embodiment.

While in the above-mentioned first embodiment, the directions of movement of the individual screws 40, 42, 46 are all vertical with respect to the mating surface A, in this fifth embodiment, the direction of movement of the screws 46 is vertical with respect to the mating surface A, but the directions of movement of the other screws 40, 42 are horizontal or parallel with respect to the mating surface A. Thus, the directions of movement of the respective screws 40, 42, 46 are not the same, so the assembling efficiency of this fifth embodiment is slightly lower as compared with the first embodiment.

However, in general, the application of vibration is made in a direction perpendicular to the axis of the electric motor 1, but in this fifth embodiment, the mating surface A is the vertical plane with respect to a diametrical direction of the axis of the electric motor 1, so the direction of the application of vibration is in coincidence with the longitudinal direction of the drive control unit 6. Accordingly, this fifth embodiment can ensure higher vibration resistance as compared with the above-mentioned first through fourth embodiments in which the drive control unit 6 is supported on the electric motor 1 in a cantilever fashion.

The effects of this fifth embodiment other than the above are similar to those of the first embodiment.

Embodiment 6

Figure 9:
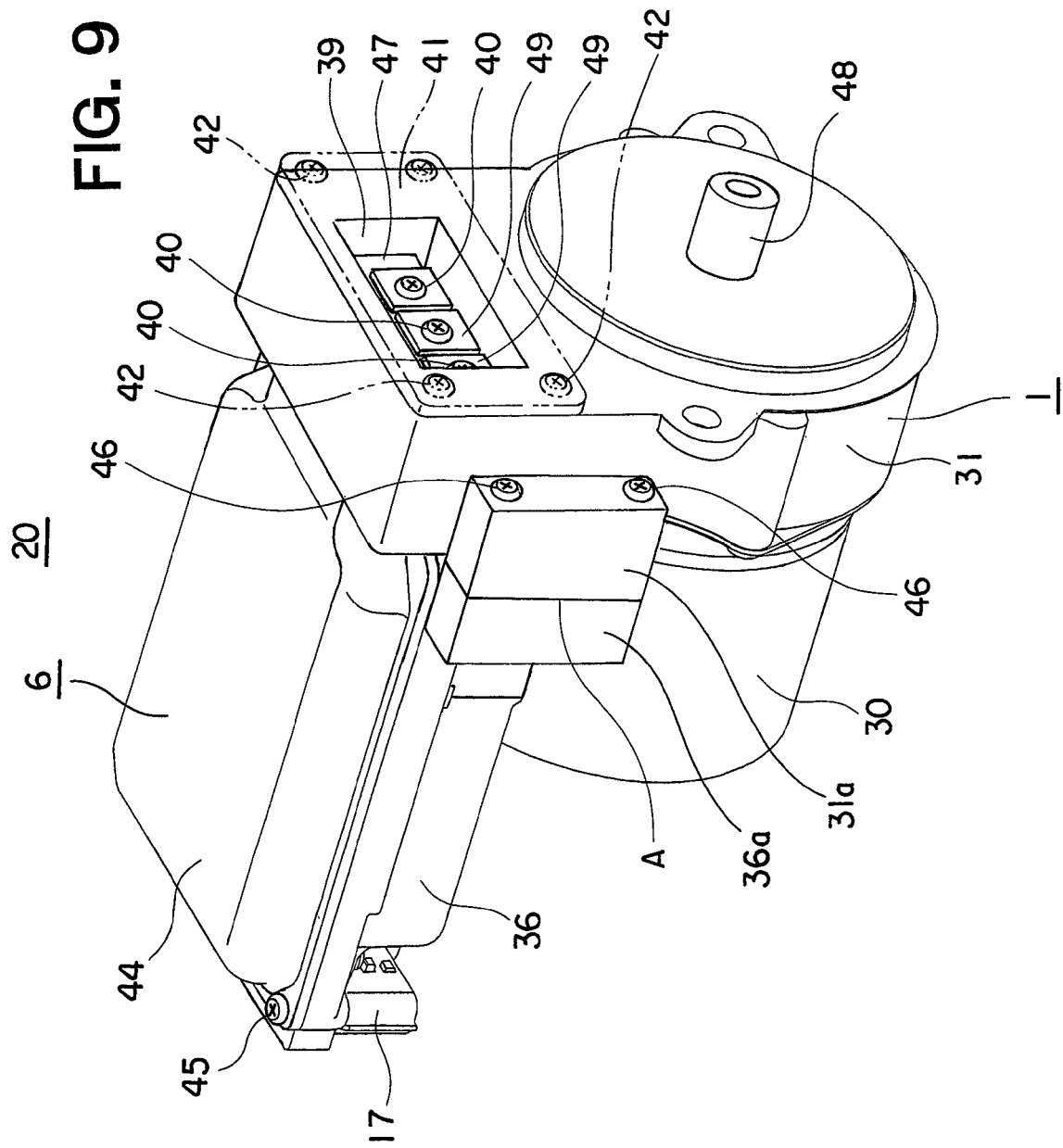
FIG. 9 is a perspective view showing an electric power steering apparatus according to a six embodiment of the present invention.

FIG. 9 is a perspective view that shows an electric power steering apparatus 20 according to a sixth embodiment of the present invention. In this sixth embodiment, a power supply terminal block 47 extending from a drive housing 36 is located in a chamber 39 that is formed in a motor housing 31. A mating surface A between a mounting portion 31*a* of the motor housing 31 and a mounting portion 36*a* of a drive housing 36 is a vertical plane with respect to an axis of an electric motor 1. A drive control unit 6 is arranged at a side at which it overlaps with the electric motor 1 when seen along a direction perpendicular to the axis thereof.

The construction of this sixth embodiment other than the above is similar to that of the second embodiment.

In this sixth embodiment of the present invention, the directions of movement of screws 40, 42, 46 are the same horizontal direction parallel to the mating surface A, and the operation of mounting and dismounting the drive control unit 6 on and from the electric motor 1 and the operation of connecting and disconnecting between the power supply terminal block 47 and power supply input bus bars 49 are concentrated in the same one direction, so the same advantageous effects as in the first embodiment can be achieved.

Since a steering wheel joint 23 is arranged in a direction perpendicular to a horizontal direction of a vehicle (a horizontal or parallel direction with respect to the ground), mounting and dismounting operations are carried out from the direction of vehicle sides, and in case where the electric power steering apparatus 20 is to be mounted on a column shaft 21 (refer to FIG. 1), such an operation can be done in the horizontal direction of the vehicle from a vehicle cabin, thus making it possible to further improve the operation efficiency.

In addition, it is preferable that in case where there is no space available in the diametrical surroundings of a gear housing 22, a drive control unit 6 can be arranged at a location not conflicting with the gear housing 22.

The effects of this sixth embodiment other than the above are similar to those of the first embodiment.

Here, note that in the above-mentioned respective embodiments, the screws 40, 42, 46 are used for the assembly and electrical connection between the electric motor 1 and the drive control unit 6, but the present invention is of course not limited to this.

For example, the connection of the terminal blocks 32, 47 with the bus bars 37, 49, respectively, can instead be made by connector engagement, caulking, TIG welding, fusing, or the like, and the cover 41 for the chamber 39 can be attached to the opening portion thereof by snap fitting, heat caulking, resin packing bonding, etc.

In addition, although in the respective embodiments, the electric motor 1 of the type of a brushless motor has been described, and electric power steering apparatus according to the present invention can use other type of motors such as an induction machine or motor.

Although in the above-mentioned respective embodiments, reference has been made to the location of connection of three-phase wiring through which a drive current between the electric motor 1 and the drive control unit 6 is input and output, the present invention can be applied to a location of connection of a signal line through which a signal between the rotational position sensor 3 of the electric motor 1 and the control circuit 12 of the drive control unit 6 is transmitted, as in the case of the location of connection of the three-phase wiring.

In this case, a similar advantageous effect can be obtained though it is necessary to arrange, in the chamber 39, the location of connection of the signal line as well as the location of connection of the three-phase wiring, too, and hence the space in the chamber 39 becomes slightly larger.

Here, note that in case where the electric motor 1 is provided, in addition to the signal line for the rotational position sensor 3, with parts that serve to transmit signals between the drive control unit 6 and other sensors such as a current sensor, a temperature sensor, etc., through signal lines, the present invention can of course be applied to the location of connection of these signal lines, too.

Moreover, although reference has been made to the electric power steering apparatus 20 of a column assist type in which the electric power steering apparatus 20 is fitted to the column shaft 21 so that the column shaft 21 is torque assisted by the electric motor 1, the present invention can also be applied to an electric power steering apparatus of a rack assist type or a pinion assist type in which a rack or a pinion on the rack is assisted by the torque of an electric motor.

In this case, the electric power steering apparatus is fitted to the rack in a lower portion of a vehicle, but the present invention can be applied in accordance with the layout of surrounding vehicle members and other parts.

In addition, after the drive control unit 6 is replaced with a new one by applying the present invention, it is necessary to match and adjust individual control parameters between the new drive control unit 6 and the electric motor 1. In this case, such matching and adjustment of the control parameters can be performed by the operation of external telecommunications equipment by an operator, but it is desirable that upon first actuation and driving after the replacement, the electric power steering apparatus 20 itself perform such matching and adjustment operations in an automatic manner, thereby making it possible to further improve the operation efficiency.

In particular, for such a case, the electric power steering apparatus 20 according to the present invention is most suitable because the drive control unit 6 and the electric motor 1 are combined with each other to form an integral unit while excluding external three-phase wiring connecting between the drive control unit 6 and the electric motor 1, and hence reduction in adjustment accuracy due to external disturbances is limited.

While the invention has been described in terms of preferred embodiments, those skilled in the art will recognize that the invention can be practiced with modifications within the spirit and scope of the appended claims.

What is claimed is:
1. An electric power steering apparatus in which a motor housing of an electric motor, which is adapted to output an assist torque to a steering wheel of a vehicle, and a drive housing of a drive control unit, which serves to control the driving of an output shaft of said electric motor, are fixedly secured to each other at a mating surface with a screw in a surface to surface contact manner, and in which said motor housing and a gear housing that receives therein a gear connected with said output shaft of said electric motor are coupled with each other on the one and same axis,
   wherein a location of connection, at which a connecting portion of said electric motor and a connecting portion of said drive control unit are electrically connected to each other by a fastening member, is arranged at a joint location at which end portions of said motor housing and said drive housing are joined to each other,
   the screw and the fastening member are inserted into the motor housing and the drive housing and the connecting portions, respectively, at a side of the drive control unit opposite the gear housing, and
   the drive control unit extends away from the gear housing in a direction parallel to the axis and is arranged at a side to overlap with the gear housing when seen along a direction perpendicular to the axis.
2. The electric power steering apparatus as set forth in claim 1, wherein said location of connection is arranged in said motor housing.
3. The electric power steering apparatus as set forth in claim 1, wherein said location of connection is arranged in said drive housing.

4. The electric power steering apparatus as set forth in claim 1, wherein said mating surface is a plane perpendicular to the axis and a diametrical direction of said axis.

5. The electric power steering apparatus as set forth in claim 4, wherein said fastening member is movable in a direction perpendicular to said mating surface and the axis.

6. The electric power steering apparatus as set forth in claim 4, wherein said fastening member is movable parallel said mating surface.

7. The electric power steering apparatus as set forth in claim 1, wherein said mating surface is a plane arranged perpendicular to the axis and parallel a diametrical direction of said axis.

8. The electric power steering apparatus as set forth in claim 7, wherein said fastening member is movable parallel said mating surface.

9. The electric power steering apparatus as set forth in claim 1, wherein said location of connection is arranged in a chamber that is formed by being surrounded by a wall.

10. The electric power steering apparatus as set forth in claim 9, wherein said chamber is made airtight by means of a sealing member arranged therearound.

11. The electric power steering apparatus as set forth in claim 10, wherein said chamber has an opening portion that is adapted to be closed by a detachable cover.

12. The electric power steering apparatus as set forth in claim 11, wherein a direction of movement of said cover in which said cover is attached and detached to said opening portion is the same as a direction of movement of said fastening member in which said fastening member is fastened and unfastened.

13. The electric power steering apparatus as set forth in claim 1, wherein said connecting portion of said electric motor is power supply input bus bars that are connected to armature windings, respectively, and said connecting portion of said drive control unit is a power supply terminal block on which terminals, being in surface to surface contact with said power supply input bus bars, respectively, are constructed.

14. The electric power steering apparatus as set forth in claim 1, wherein said connecting portion of said electric motor is a power supply input terminal block which is connected to armature windings and on which terminals are constructed, and said connecting portion of said drive control unit is power supply bus bars which are in surface to surface contact with said terminals of said power supply input terminal block.

* * * * *